Sept. 5, 1933. C. TRAUT Re. 18,940

SCREEN PROTECTING DEVICE

Original Filed Sept. 18, 1930 2 Sheets-Sheet 1

INVENTOR.
Clifford Traut
BY Allen & Allen
ATTORNEYS

Sept. 5, 1933. C. TRAUT Re. 18,940
SCREEN PROTECTING DEVICE
Original Filed Sept. 18, 1930 2 Sheets-Sheet 2
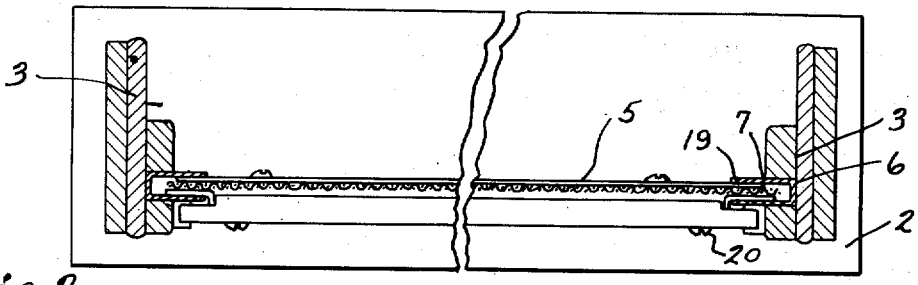
Fig. 2.
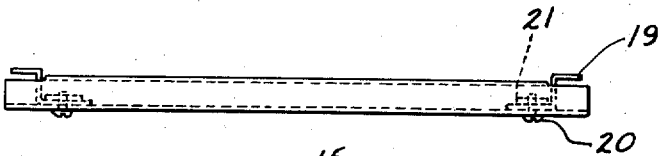
Fig. 3.
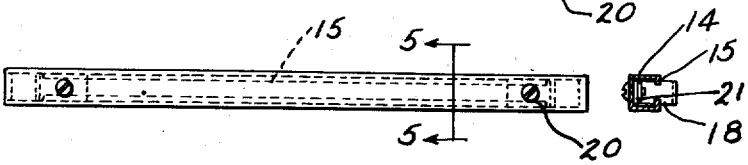
Fig. 4.
Fig. 5.
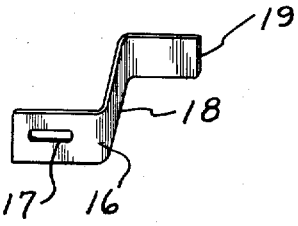
Fig. 6.
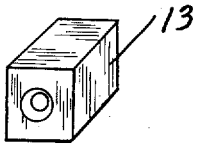
Fig. 7.
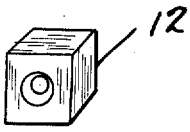
Fig. 8.
INVENTOR.
Clifford Traut
BY
Allen & Allen
ATTORNEYS Reissued Sept. 5, 1933 Re. 18,940

UNITED STATES PATENT OFFICE 18,940

SCREEN PROTECTING DEVICE

Clifford Traut, Newport, Ky., assignor to The Higgin Manufacturing Company, Newport, Ky., a corporation of West Virginia Original No. 1,833,140, dated November 24, 1931, Serial No. 482,850, September 18, 1930. Application for reissue January 28, 1932. Serial No. 589,493

14 Claims. (Cl. 156—39)

My invention relates to protecting devices for preventing screens, particularly roll screens, from being blown out of the supporting channels in which the screens are mounted.

Particularly in rolling screen structures where the side edges of the screening move in channel guides, a strong wind is likely to blow against the screen and cause the side edges of the screen to pull out from the channels. This is particularly true in the case of roll screens of large area.

It is an object of my invention to provide reinforcing cross bars which will move up and down with the screen, and which will provide braces to prevent the screen from being blown out of its side guide channels.

In the particular modification of my invention which is illustrated herein I have shown a window frame with a roll screen supported in guides in that portion of the frame which will be on the room side of the windows, and in this type of construction it is my object to provide supporting bars for the screen which will be picked up when the screen is elevated, and which will be let down into operating position when the screen is lowered to close the window opening.

It is understood that the word "screen" is used in the specifications, and the word "closure" in the claims, are not limited to mesh screens, but include flexible closure elements of any suitable character capable of operating upon the spring roller and being engaged by the side guides in the construction hereinabove described.

In the drawings:—

Figure 2 is a horizontal sectional view taken along the lines 2—2 in Figure 1.

Figure 3 is a plan view of a preferred type of screen supporting bar.

Figure 4 is a front elevation of the bar shown in Fig. 3.

Figure 5 is a sectional view taken along the lines 5—5 in Figure 4.

Figure 6 is a perspective view of the side guide slider.

Figure 7 is a perspective view of the lower stop block.

Figure 8 is a perspective view of the upper stop block.

Figure 1:
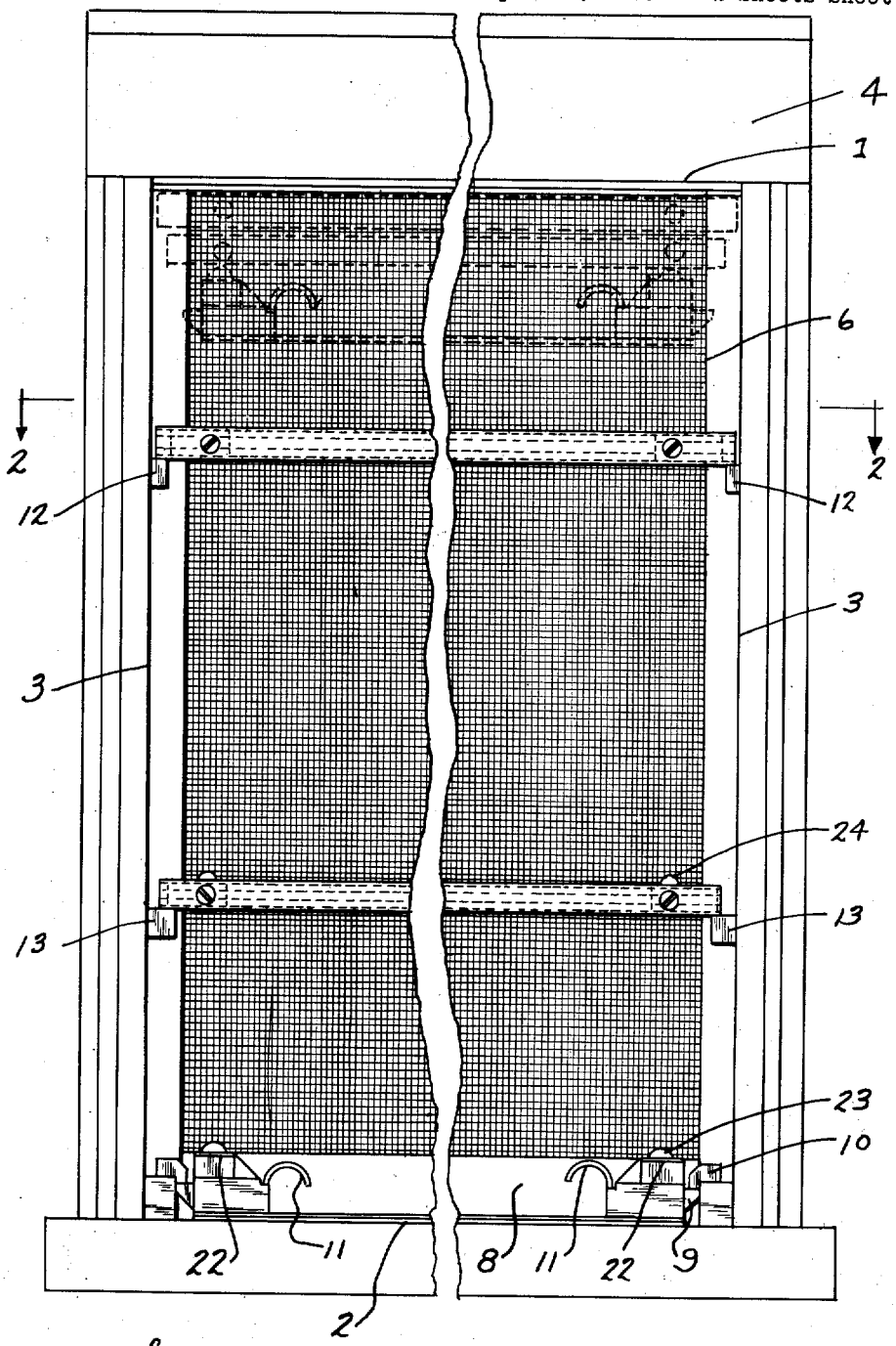
Figure 1 is a front elevation from the inside of the house or room.

The window frame illustrated has the lintle 1, sill 2, and jams 3. The roll casing 4 at the top of the frame houses the roller mechanism on which the web 5 of screening is supported. Metal channels 6 extend along the jams, and the side edges 7 of the roll screen slide up and down from a position looped around the screen roller to the bottom screen plate 8, which is provided with latches 9 which, when the screen is in lower position, locks under catches 10. The latches 9 are actuated by finger clips 11 which are drawn together when it is desired to elevate the screen.

I have shown two sets of screen supporting bar assemblies, it being understood that the number of such support assemblies, which are employed is dependent upon the size and area of the screen. I have shown upper stop blocks 12 for the upper screen support bars, and lower stop blocks 13 for the lower screen support bars.

The support bars are composed of U-shaped metal pieces 14, with the open sides thereof crimped in slightly as indicated at 15. Metal clips having attaching portions 16 which are slotted as indicated at 17, have angle spacing portions 18 and slider portions 19 which engage within the channels of the screen guides as indicated in Figure 2. Screws 20 which extend through an opening in the front face of the bar 14 extend through the slotted portion 17 of the spring clips, and nuts 21 are threaded so as to receive the inner end of the screw. Thus I provide guiding portions for the bars which will make them readily adjustable for various widths of screen. When the blocks 12 and 13 have been properly positioned it will be noted that the upper blocks 12 must only be of such dimensions as will allow the lower bar to pass. Angle pieces 22 are mounted on the bottom screen plate 8, and in order to provide quiet operation, resilient bumper blocks 23 may be mounted on the angles 22. Further, bumper blocks 24 will preferably be mounted on the upper edge of the lower screen supporting bar assembly so that when the handles 11 are drawn together, and the screen is elevated, the bumpers 23 will quietly pick up the lower supporting bars, and the bumpers 24 will quietly pick up the upper supporting bar.

When the screen is elevated it occupies the position indicated in dotted lines in Figure 1 at the top of the window frame, and as the screen is lowered the supporting bars move down to their respective positions engaging the blocks 12 and 13.

It will, of course, be possible to mount the stops 12 and 13 on the screen channels, and although preferable it is not essential that the screen supporting bars can be inserted within the guide channels by tipping one end of the bars up until its slider 19 disengages the channel 6.

While, in the construction shown, the roll screen is on the inner side of the window, and the sash is outside the screen, this is not essential in a construction of supporting members such as have been described.

Having thus described my invention, what I claim as new and desire to secure by Letters Patent, is:—

1. In combination with a rolling closure frame, means mounted independently of the closure and movable to predetermined position with the lowering of the closure and providing a lateral brace to prevent distortion of the closure within its mounting, said closure frame having guiding channels, and said means provided with sliders engaging said channels.

2. In combination with a rolling closure frame, means movable to predetermined position with the lowering of the closure and providing a lateral brace to prevent distortion of the closure within its mounting, said closure frame having guiding channels, and said means provided with sliders engaging said channels, said sliders being adjustable laterally of said means.

3. In combination with a rolling closure frame, means movable to predetermined position with the lowering of the closure and providing a lateral brace to prevent distortion of the closure within its mounting, said closure frame having guiding channels, and said means provided with sliders engaging said channels, said means comprising at least two bars extending across the frame in spaced position.

4. In combination with a rolling closure frame, means movable to predetermined position with the lowering of the closure and providing a lateral brace to prevent distortion of the closure within its mounting, said closure frame having guiding channels, and said means provided with sliders engaging said channels, said means comprising at least two bars extending across the frame in spaced position, said bars being provided with bumpers to make the operation of the closure noiseless.

5. In combination with a rolling closure frame and spaced bars extending laterally across said frame to prevent distortion of a closure within said frame, spaced stops on said frame for supporting said bars, and the upper of said stops being spaced farther apart than said lower stops to allow clearance for the passage of the lowermost of said bars.

6. In combination with a closure frame and a closure slidable therein, guides for said closure and spaced movable bars relatively to which said closure is movable extending laterally across said frame to prevent distortion of said closure within said guides, said bars engaging said guides and means connected to said closure and movable with the elevation of said closure within the guides to move said bars therewith.

7. In combination with a window closure frame, means mounted for movement independently of the closure and a stop against which said means is movable to predetermined position with the closing movement of the closure and providing a brace for the closure laterally across the frame and the closure for the purposes described.

8. In combination with a rolling closure frame and a closure slidable therein, guides for said closure and spaced bars relatively to which said closure is movable, extending laterally across said frame to prevent distortion of said closure within said guides, said bars engaging said guides and means connected to said closure and movable with the elevation of said closure to move said bars therewith.

9. In combination with a frame for a movable window closure, means mounted on the frame for movement therealong independently of the closure and providing a brace for the closure laterally across the frame, and stop means mounted in the path of said movement to limit said movement in one direction.

10. In combination with a frame for a movable window closure, said frame comprising side guides along the path of movement of the closure, means mounted in said guides for movement of said means independently of the closure, said means extending laterally across the frame and adapted to prevent distortion of the closure.

11. In combination with a frame for a movable window closure, said frame comprising side guides for the closure, means mounted in said guides for movement of said means independently of the closure, comprising a sliding bar having sliders engaging in said guides, said means extending laterally across the frame and adapted to prevent distortion of the closure.

12. In combination with a frame for a movable window closure, said frame comprising side guides along the path of movement of the closure, spaced bars mounted in said guides and movable therein relatively to the closure and extending laterally across said frame to prevent distortion of the closure within the guides.

13. In combination with a frame for a movable closure and guides for the closure, spaced bars movable on and extending laterally across said frame to prevent distortion of said closure within said guides, and spaced stops on said frame for supporting said bars.

14. In combination with a frame for a movable window closure, means mounted on the frame for vertical movement independently of the closure and providing a brace for the closure laterally across the frame to prevent distortion of the closure within said frame, and stop means mounted in the path of said movement to limit downward movement of said brace means.

CLIFFORD TRAUT.